(12) United States Patent
Lewis et al.

(10) Patent No.: US 10,913,338 B2
(45) Date of Patent: *Feb. 9, 2021

(54) LIFT ASSIST LOCK-DOWN FOR A SOFT TOP

(71) Applicant: Bestop, Inc., Louisville, CO (US)

(72) Inventors: Stephen J. Lewis, Harrison Township, MI (US); Tavis Lutzka, Rochester Hills, MI (US)

(73) Assignee: Bestop, Inc., Louisville, CO (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/935,919

(22) Filed: Mar. 26, 2018

(65) Prior Publication Data

US 2018/0208034 A1  Jul. 26, 2018

Related U.S. Application Data

(63) Continuation-in-part of application No. 15/354,663, filed on Nov. 17, 2016, now Pat. No. 10,166,848.

(60) Provisional application No. 62/476,145, filed on Mar. 24, 2017, provisional application No. 62/256,482, filed on Nov. 17, 2015.

(51) Int. Cl.
  *B60J 7/185* (2006.01)
  *B60J 7/06* (2006.01)
  *B60J 7/12* (2006.01)

(52) U.S. Cl.
  CPC ............. *B60J 7/1855* (2013.01); *B60J 7/062* (2013.01); *B60J 7/1291* (2013.01); *B60J 7/1856* (2013.01)

(58) Field of Classification Search
  CPC ........ B60J 7/1855; B60J 7/062; B60J 7/1291; B60J 7/1856

USPC ........................................................ 296/110
See application file for complete search history.

(56) References Cited

U.S. PATENT DOCUMENTS 6,295,713 B1   10/2001   Hilliard et al.
6,409,247 B1    6/2002   Maass
(Continued)

FOREIGN PATENT DOCUMENTS

BE       350963 A      4/1928
DE    10102643 A1      7/2002
(Continued)

OTHER PUBLICATIONS

International Search Report for Application No. PCT/US2015/022716 dated Jun. 8, 2015 (4 pages).

*Primary Examiner* — Joseph D. Pape
*Assistant Examiner* — Dana D Ivey
(74) *Attorney, Agent, or Firm* — Warn Partners, P.C.

(57) ABSTRACT

A lift assist lock-down assembly for a soft top assembly, the lock-down assembly operably coupled to first and second bows selectively rotatable between an open/sunroof position and an open/downward position. A handle member is rotatable between unlocked and locked positions. A cam and a cam lockout selectively prevent the bows from rotating. When locked in a first position, the bows are prevented from rotating generally rearward/downward, thereby preventing the soft top assembly from moving into the open/downward position. When locked in a second position, the bows are prevented from rotating generally forward/upward, thereby generally preventing the soft top from bouncing or from moving into the open/sunroof position.

20 Claims, 9 Drawing Sheets

(56) References Cited

U.S. PATENT DOCUMENTS

| | | | |
|---|---|---|---|
| 7,959,208 B2 * | 6/2011 | Neubrand | B60J 7/0069 |
| | | | 296/107.16 |
| 9,346,342 B1 | 5/2016 | Bowles | |
| 2001/0030443 A1 | 10/2001 | Barker | |
| 2004/0108747 A1 | 6/2004 | Obendiek | |
| 2012/0098292 A1 | 4/2012 | Huotari et al. | |
| 2012/0286540 A1 | 11/2012 | Moran et al. | |
| 2014/0339851 A1 | 11/2014 | Bennett et al. | |

FOREIGN PATENT DOCUMENTS

| | | | |
|---|---|---|---|
| GB | 311081 | A | 5/1929 |
| GB | 336514 | A | 10/1930 |
| WO | 2004056596 | A2 | 7/2004 |

* cited by examiner

LIFT ASSIST LOCK-DOWN FOR A SOFT TOP

CROSS-REFERENCE TO RELATED APPLICATIONS

The instant application is a non-provisional of 62/476,145, filed Mar. 24, 2017, and the instant application is a continuation-in-part of U.S. patent application Ser. No. 15/354,663, filed Nov. 17, 2016, which claims the benefit of U.S. Provisional Patent Application No. 62/256,482, filed Nov. 17, 2015. The disclosures of the above applications are incorporated herein by reference.

FIELD OF THE INVENTION

The present invention relates to a lift assist locking mechanism for soft tops for vehicles.

BACKGROUND OF THE INVENTION

Foldable soft tops for vehicles are known in the art. These tops provide a vehicle with an open air experience with the top folded back or provide protection from the elements with the top closed. Such tops are typically manually retractable and during retraction the operator has to perform a series of manipulations of the top. Additionally, manual management and stowage of the fabric materials of the top during folding must be accomplished.

In recent years a soft top "sunroof" has become a well-received option for folding SUV soft tops. This "sunroof" typically folds back such that the operator can readily provide an open air experience to the front cockpit area without stowing the entire soft top. While this sunroof option has become a very desirable feature, it does require considerable force at the start of the deployment due to the operator's angle of attack. The mass of the frame mechanism for folding the top cover fabric and fabric becoming trapped in the frame mechanism linkage are additional concerns. Also, fabric management is occasionally problematic in that the fabric can become entangled or interfere with the frame mechanism of the top. Another problem is that current systems do not latch the soft tops in the sunroof position at all and/or do not quickly and effectively lock the soft tops in the open sunroof position.

In addition, at times an operator may desire an even greater open air experience where the soft top is moved rearward to an open/downward or stowed positions or removed from the vehicle. Current systems do not latch the soft tops in the open/downward position at all and/or do not quickly and effectively lock the soft tops in the open/sunroof position.

Therefore, there remains a need in the art to provide a lift-assist lockdown mechanism that locks the soft top in the open/sunroof position and also allows the soft top to be selectively rotated into an open/downward position and selectively held in the position.

SUMMARY OF THE INVENTION

In accordance with the present invention, there is provided a locking lift assist assembly for a soft top, such as a soft top for SUVs, foldable soft tops for SUVs and folding/sliding or otherwise retractable soft tops for SUVs. The locking lift assist assembly is preferably a rearward mounted mechanism, for selectively locking the soft top in position when in at least the open/sunroof position and the open/downward position.

The lift assist locking mechanism is lockable in a first direction to hold the soft top in the open/sunroof position, preferably, by a cam that prevents the soft top from moving rearward to the open/downward position. The locking mechanism is also selectively releasable by an operator to allow the soft top to be operably moved from the open/sunroof position to the open/downward, when desired, preferably, by moving the cam out of a locking position to allow rotation generally rearward/down to the open/downward position. A cam lockout prevents the soft top from rotating back to the open/sunroof position when not desired. Preferably, when in the open/downward position and locked, the soft top can be selectively released to a stowed position or released and removable from the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
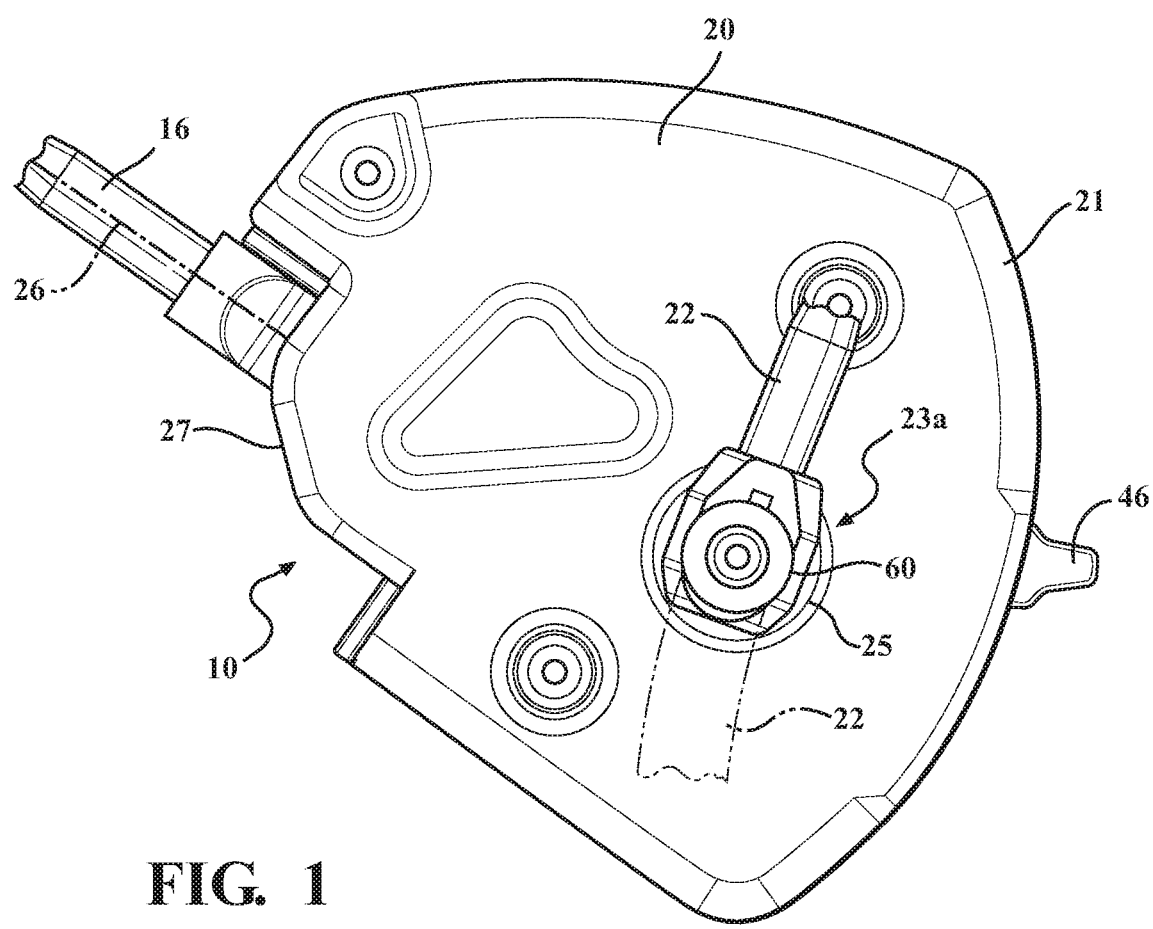
FIG. 1 is a side elevation view of a locking lift assist assembly for a soft top in an open/sunroof position, depicting a first upward bow and also a second upward bow in an upward position and, in phantom, rotated to a downward position, in accordance with the present invention.

The following description of the preferred embodiment(s) is merely exemplary in nature and is in no way intended to limit the invention, its application, or uses.

Referring to FIGS. 1-15 generally, there is provided a locking lift assist assembly shown generally at 10 (or "assembly"), in accordance with the present invention, for a soft top assembly shown generally at 14 for a vehicle 15. The locking lift assist assembly 10 is operably connected to the vehicle, preferably, connected to a roll bar or sport bar, most preferably, to a rear sport bar 12. The locking lift assist assembly 10 selectively holds the soft top assembly 14 in predetermined positions, as desired. Preferably, the soft top assembly 14 incorporates at least two lift assist assemblies 10, each connected to a respective rear sport bar 12.

A first upward bow 16 (or "first arm member") is operably rotatably connected toward its one end to the locking lift assist assembly 10 and is operably connected to a first rear bow 18 toward the other end. The first upward bow 16 is broken along its length in the figures to illustrate that the first upward bow 16 can be any suitable length.

The first rear bow 18 is a cross car bow, and one first upward bow 16 is operably connected toward both ends of the first rear bow 18. Preferably, the first upward bow 16 is operably rotatably connected to a housing 20 of the assembly 10 to allow rotation of the first rear bow 18 between a generally raised position when the soft top assembly 14 is in the closed or open/sunroof positions and a generally lowered position when the soft top assembly 14 is in the open/downward position.

A second upward bow 22 (or "second arm member") is operably rotatably connected toward its one end to the locking lift assist assembly 10 and is operably connected to a second rear bow 24 toward the other end. The second upward bow 22 is broken along its length in the figures to illustrate that the second upward bow 22 can be any suitable length.

The second rear bow 24 is a cross car bow. One second upward bow 22 is operably connected toward both ends of the second rear bow 24. Preferably, the second upward bow 22 is operably rotatably connected to the housing 20 of the assembly 10 to allow rotation of the second upward bow 22 between a generally raised position when the soft top assembly 14 is in the closed or open/sunroof positions and a generally lowered position when the soft top assembly 14 is in the open/downward position. Most preferably, the second upward bow 22 is operably rotatably connected to the housing 20 of the assembly 10 at a joint shown generally at 23a to provide rotation of the second upward bow 22 between a generally upward position when the soft top assembly 14 is to be closed or is functioning in the sunroof position and a generally downward position when functioning in the open/downward position when a more open air feel is preferred.

Preferably, the housing 20 has at least a first half 19 operably connected to a second half 21, where the second half 21 is most preferably a cover with at least one opening 25 to accommodate the joint 23a for the second upward bow 22. The housing 20 has a second opening 27 which allows rotation of the first upward bow 16 generally raised/lowered between the open/sunroof position and the open/downward position. Preferably, the second opening 27 is provided by a gap between the first and second halves 19,21 of the housing 20. Most preferably, the first upward bow 16 is pivotally connected to the housing 20 at pivot point 29 on the side wall of the opening 27.

It is most desirable that the soft top assembly 14 be selectively lockable in both the sunroof position and in the stowed position. Accordingly, the lift assist assembly 10 provides lock-down capabilities for the downward position, and, additionally, locking capabilities for the sunroof position (and closed position), when desired. When in the downward position, the user can operate the vehicle without locking the soft top stack. But if the user desires to lock the stack instead, such as when taking the vehicle off-road to prevent too much stack bouncing, the user can lock the soft top stack. In addition, when locked, the user is able to then remove the whole stack from the vehicle, if desired.

At least one cable 26 is operably coupled to the first upward bow 16, preferably, located within the first upward bow 16. The at least one cable 26 is operated by a user, preferably using a handle mechanism 28 on the first rear bow 18 (however, other locations and mechanisms are contemplated depending on the application without departure from the scope of the present invention) to move at least one cam 30, e.g., to cause rotation of the cam 30. Preferably, the cam 30 keeps the soft top assembly 10 in the open/sunroof position.

The cam 30 is operably connected to the housing 20, most preferably, operably rotatably connected within the housing 20 at pivot point 31. The cam 30 includes a connection feature 32 operably connected to the cable 26 (e.g., connection feature such as a pin, roller, guide feature, and/or boss, etc.) extending generally transverse to the body of the cam 30, or aperture. Operating the handle mechanism 28 causes the cable 26 to pull the connection feature 32 within a slot 34 formed in the housing 20 (i.e., see FIGS. 1-2) to thereby rotate the cam 30 in a first direction (indicated by arrow 'a' in FIG. 4), e.g., counterclockwise. Preferably, at rest, the cam 30 is operably biased toward a direction with a spring or any other suitable biasing feature. Pulling the cable 26 overcomes that bias to move the cam 30 in the first direction 'a'. Preferably, a biasing member 38, e.g., spring member or other suitable feature hooks at one end to the cam 30 and the other end 40 at a cam lockout 42 and/or to the housing 20.

The cam lockout 42 is operably rotatably connected to the housing 20 at pivot point 43. Preferably, the cam lockout 42 is a spring loaded tang. Preferably, the cam lockout 42 keeps the soft top assembly 10 from rotating.

The assembly 10 also includes a rotatable member 44 operably rotatably connected to the housing 20 at inner joint 23b. Preferably, the rotatable member 44 is operably coupled to the second upward bow 22. Most preferably, the inner joint 23b is within the housing 20 between the first and second halves 19,21 of the housing 20.

The rotatable member 44 is rotatable in first and second directions (indicated by arrows 'b' and 'e'), e.g., 'b' counterclockwise and 'e' clockwise. The cam 30 abuts against a first surface 48 of the rotatable member 44, which prevents further rotation of the rotatable member 44 and soft top assembly 10. But when the cam 30 is rotated in the first direction 'a' away from the rotatable member 44 to rotate out of engagement with the first surface 48, the rotatable member 44 is allowed to rotate in the first direction 'b'. When the rotatable member 44 rotates in the second direction 'e' and the cam lockout 42 rotates in a first direction (indicated by arrow 'd'), e.g., counterclockwise, a second surface 50 of the rotatable member 44 abuts against a surface 36 of the cam lockout 42, which prevents further rotation of the rotatable member 44 and soft top assembly 10.

A handle member 46 is also operably rotatably connected to the housing 20 at inner joint 23b. The handle member 46 is rotatable in both directions. Preferably, rotatable member 44 and handle member 46 are mounted at inner joint 23b within the housing 20 having the same axis of rotation. Most preferably, the rotatable member 44 and handle member 46 are rotatably mounted within the housing at inner joint 23b located between the first and second halves 19,21 of the housing 20, and having the same axis of rotation, and the second upward bow 22 is rotatably mounted, having the same axis of rotation relative to the rotatable member 44 and handle member 46, at joint 23a outside of the housing 20. The joints 23a,23b including common axis of rotation and arm 60 or shaft upon which the rotatable member 44, handle member 46 and second upward bow 22 are rotatably mounted. Optionally, the arm 60 has at least one keyed feature 62 for coordinated rotation of elements.

The handle member 46 has a first portion 52 integrally formed with a second portion 54. The cam lockout 42 includes a protrusion 56 that is generally guided by the second portion 54 of the handle member 46 to cause rotation of the cam lockout 42 in either direction.

Figure 2:
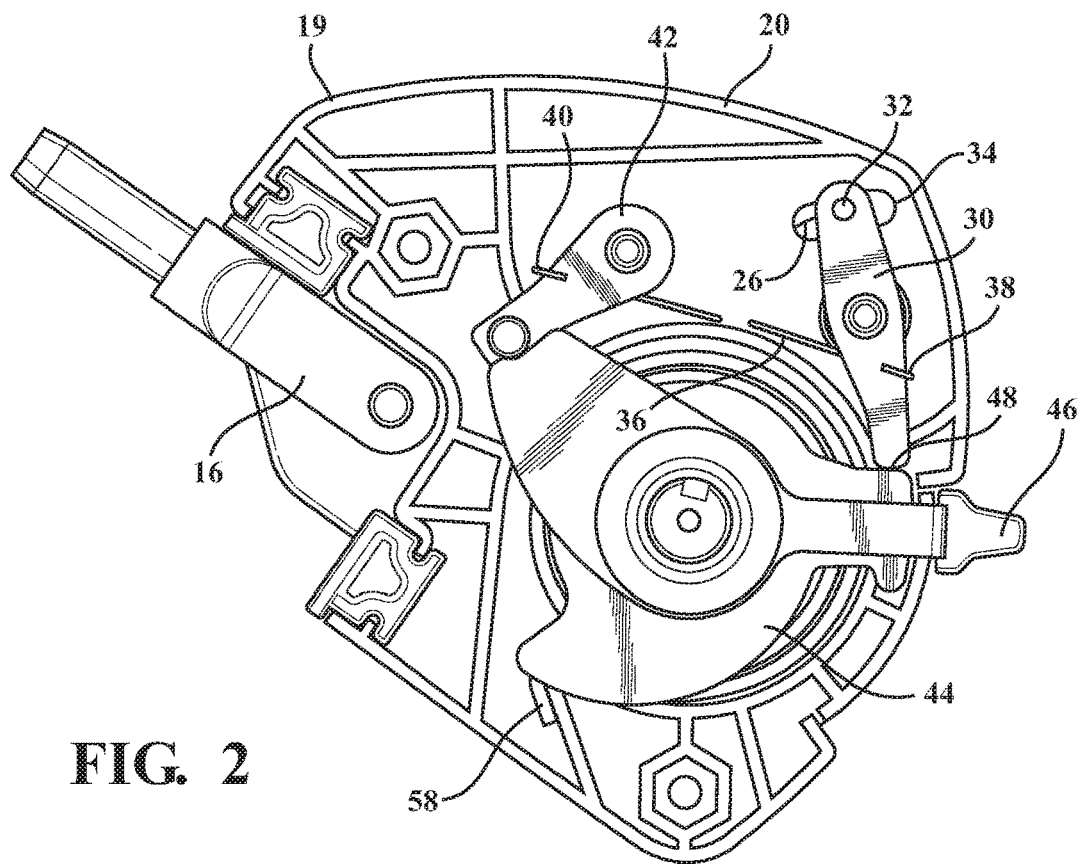
FIG. 2 is a side elevation view of the locking lift assist assembly, with a first half of the housing removed, depicting a handle member in an unlocked position, in accordance with the present invention.
Figure 3:
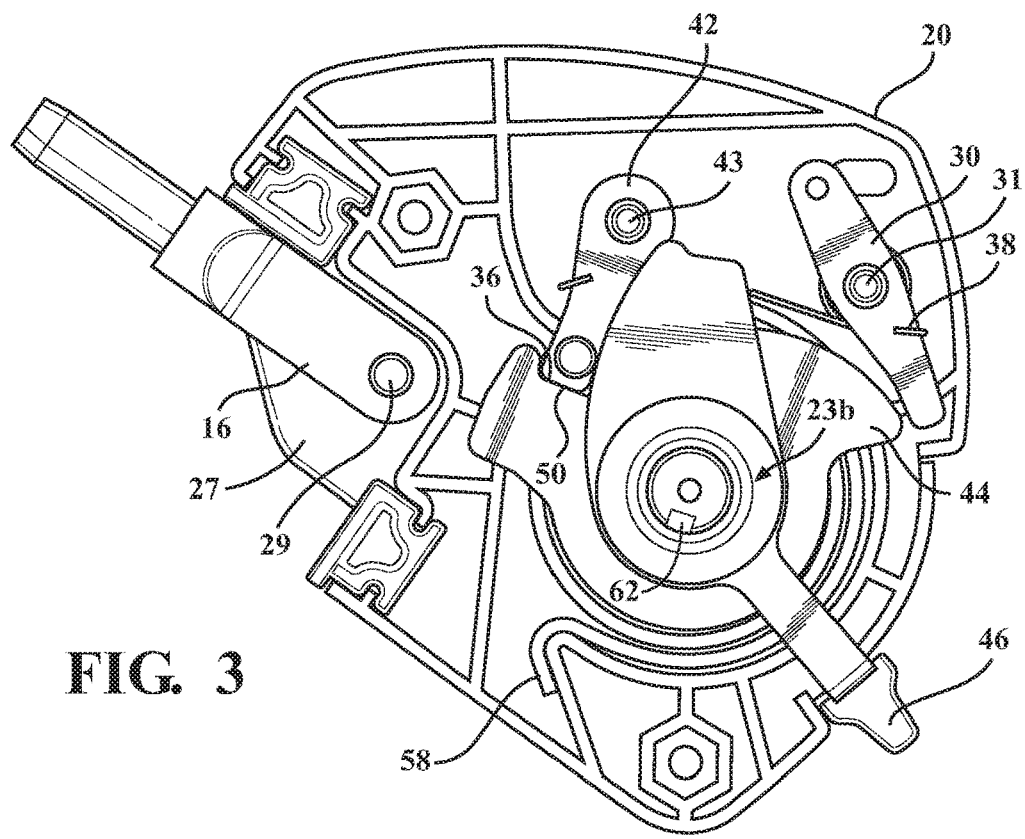
FIG. 3 is a side elevation view of the locking lift assist assembly, with the first half of the housing removed, depicting the handle member in a locked position, in accordance with the present invention.
Figure 4:
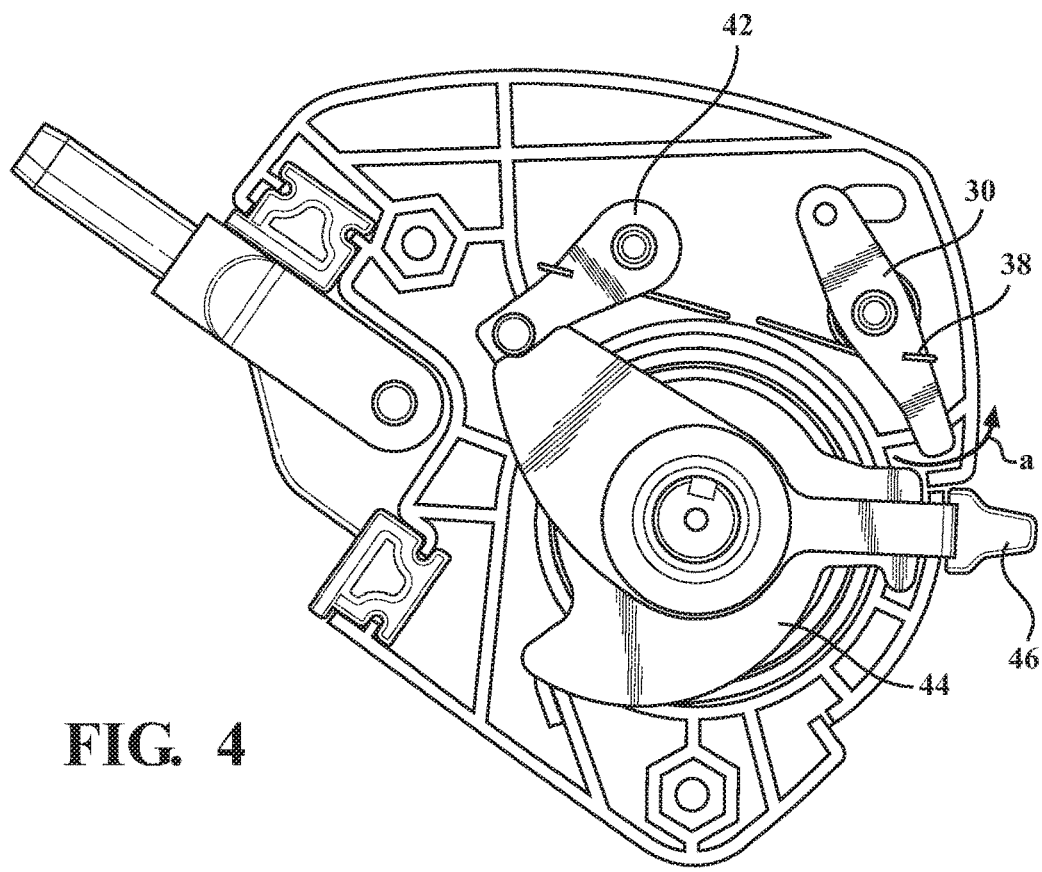
FIGS. 4-10 are side elevation views of the locking lift assist assembly in sequence, with the first half of the housing removed, illustrating operation of the assembly between unlocked and locked positions, in accordance with the present invention.
Figure 5:
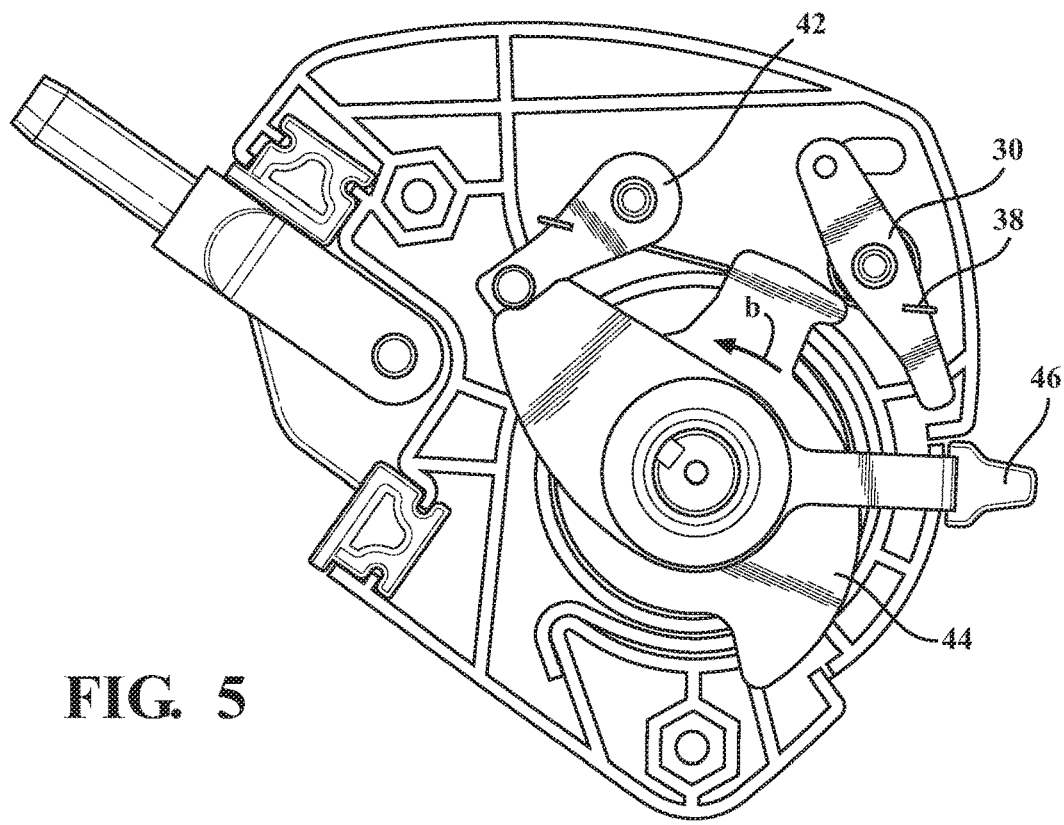
Figure 6:
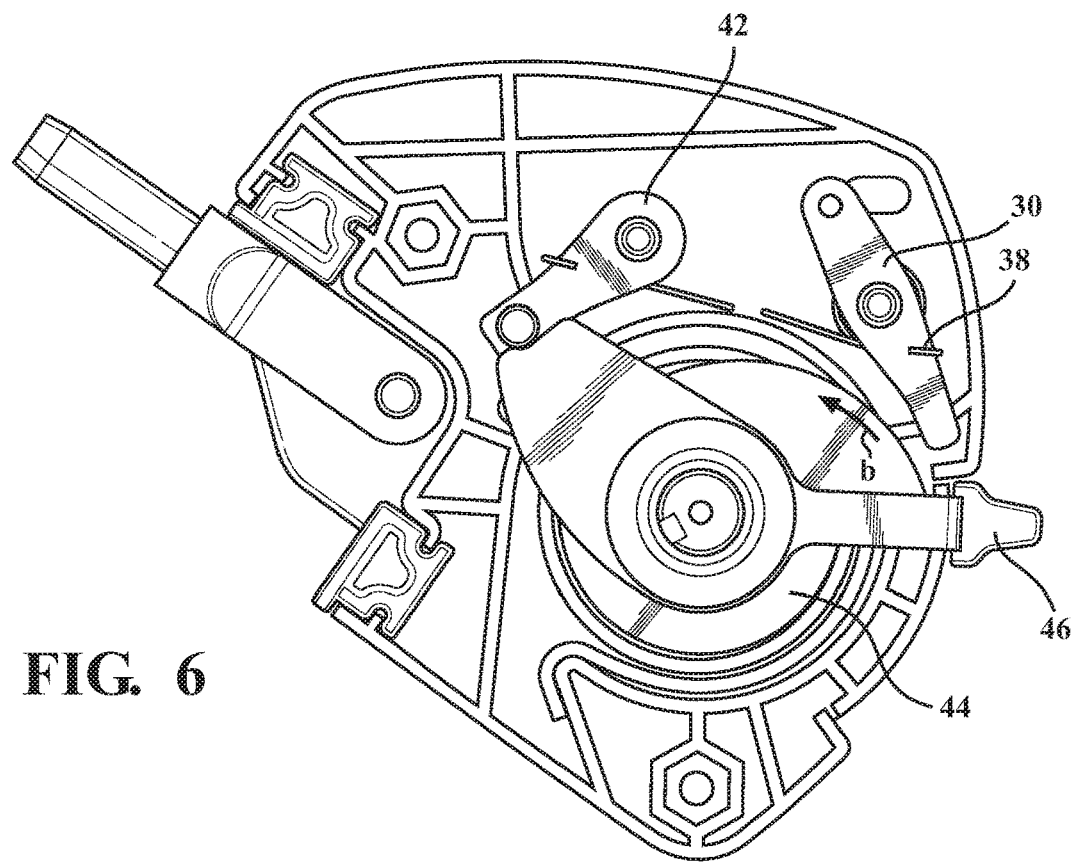
Figure 7:
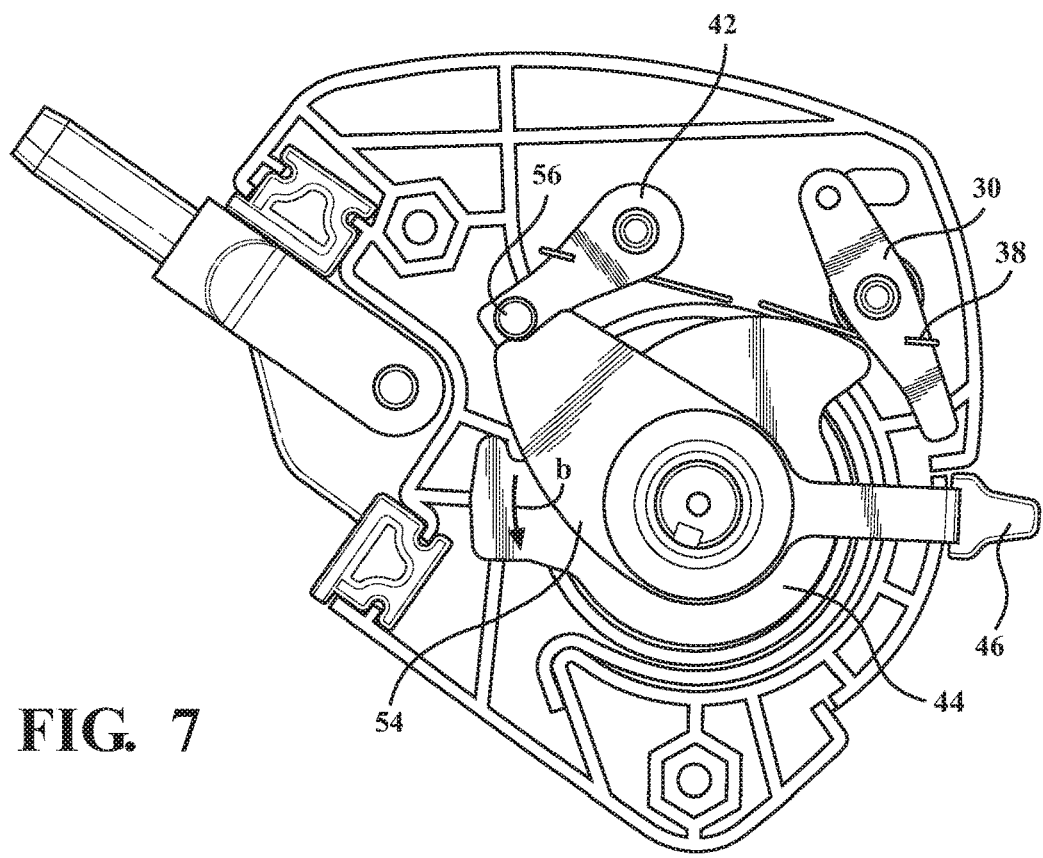
Figure 8:
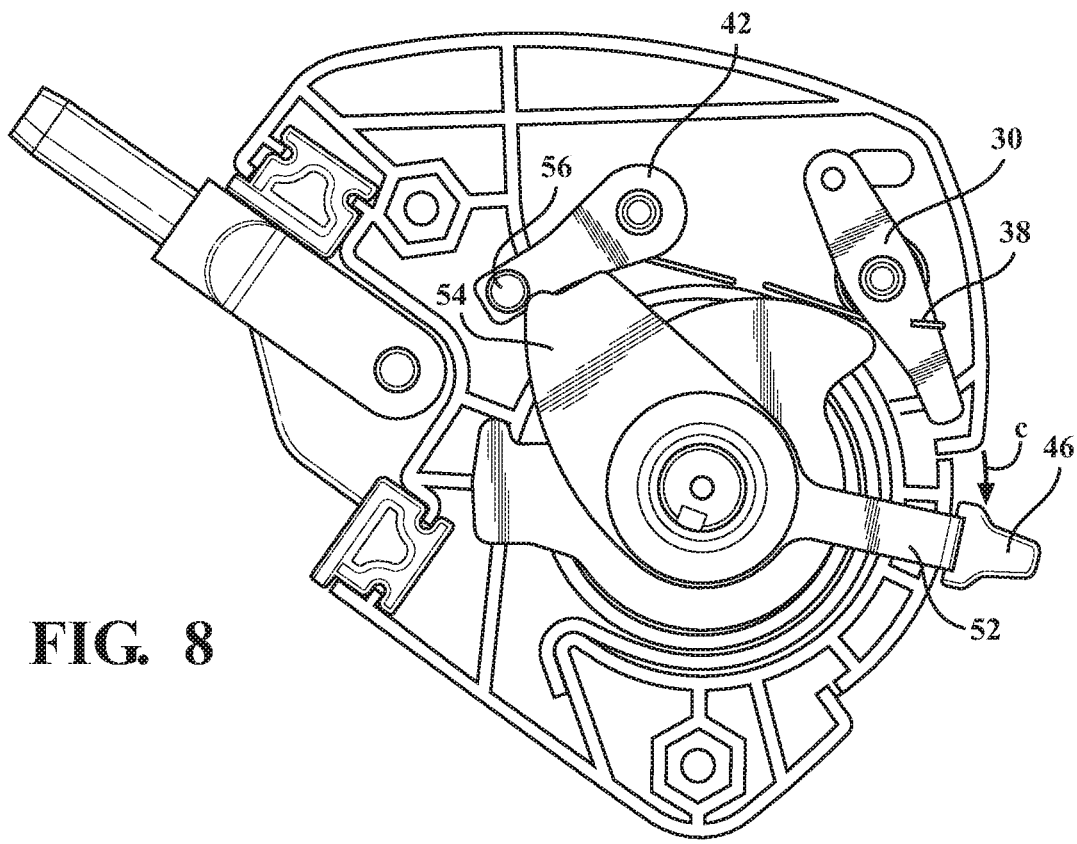

The handle member 46 is selectively caused to rotation in a second direction (as indicated by arrow 'c'), e.g., clockwise, from an unlocked position (upward location; see FIG. 2) to a lockout position (downward location; see FIG. 3). When the first portion 52 of the handle member 46 is up (unlocked position), the second portion 56 of the handle member 56 keeps the cam lockout 46 from abutting against the rotatable member 44. When the first portion 52 is down (locked position), the second portion 56 has rotated enough out of the way of the cam lockout 42 so that the cam lockout 42 can rotate in the first direction 'd' into engagement with the rotatable member 44. Thus, as the handle member 46 is rotated 'c' to the locked position, the cam lockout 42 can rotate in the first direction 'd' and the rotatable member 44 can rotate in the second direction 'e' until the second surface 50 of the rotatable member 44 abuts against the surface 36 of the cam lockout 42, which prevents further rotation.

Figure 9:
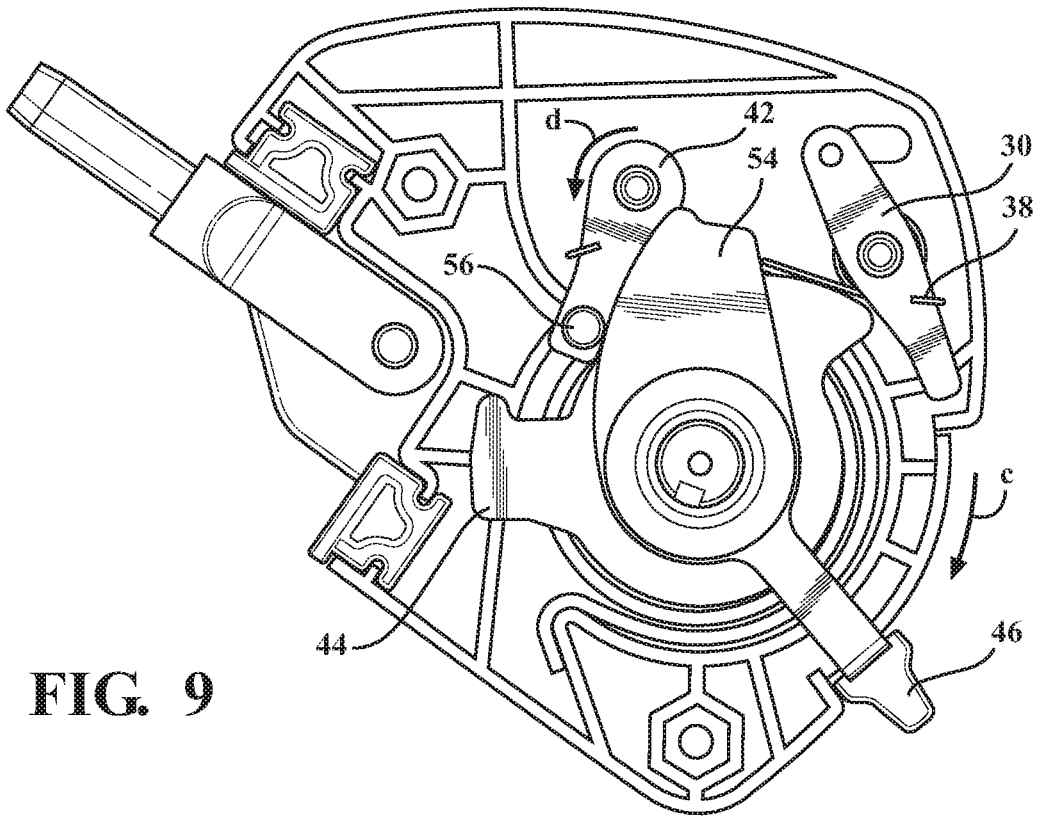
Figure 10:
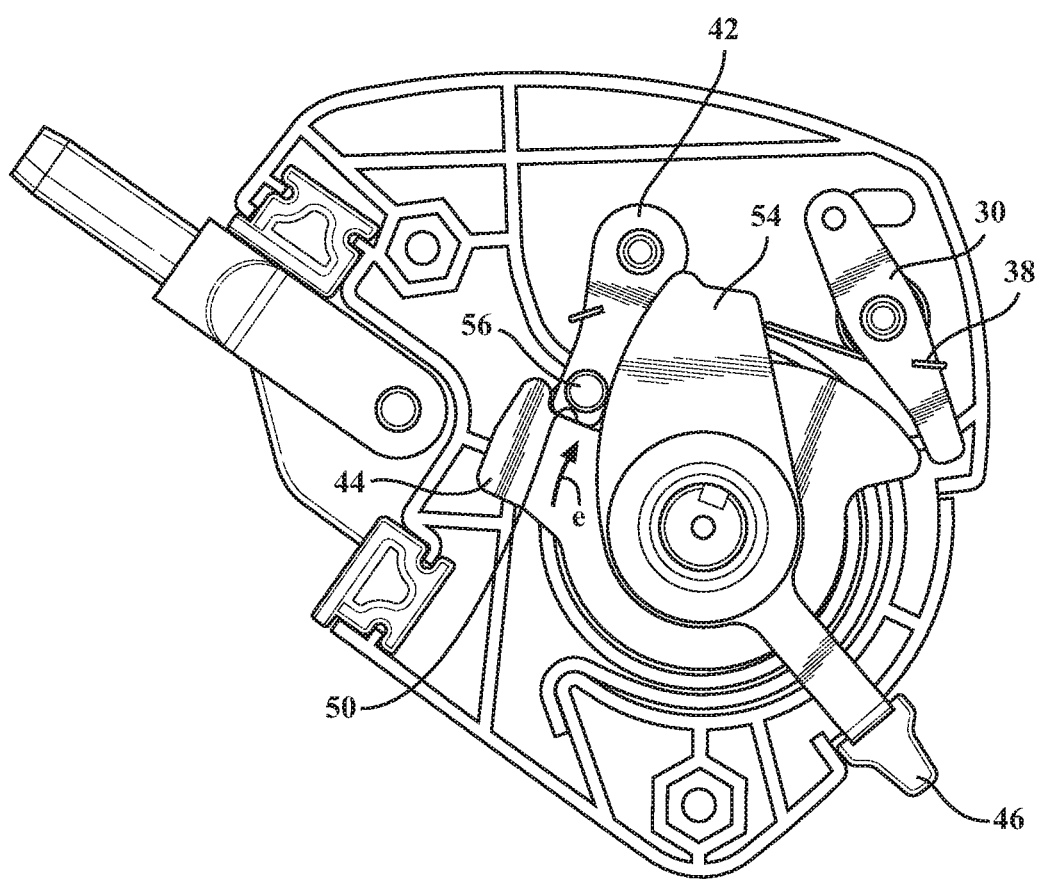
Figure 11:
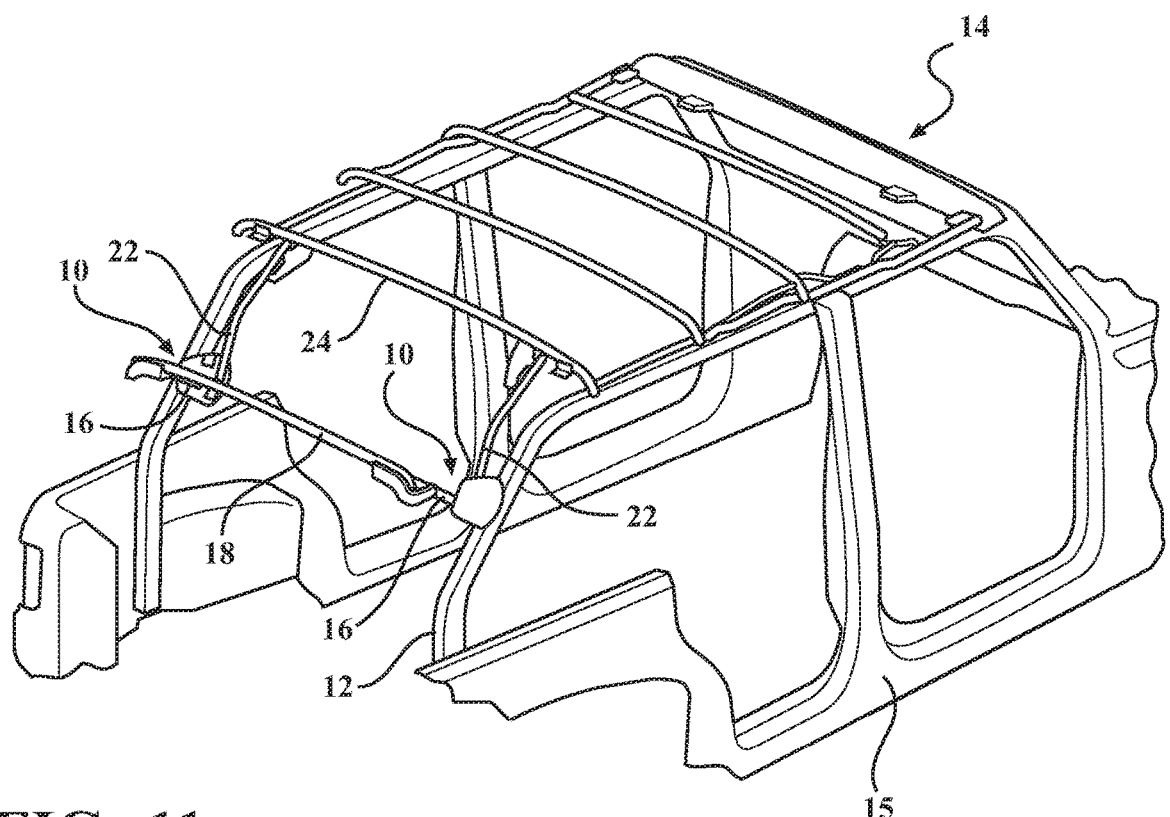
FIG. 11 is a perspective view of an exemplary soft top assembly, depicted in an exemplary closed position, incorporating the locking lift assist assembly, and with a cover material omitted for clarity, in accordance with the present invention.
Figure 12:
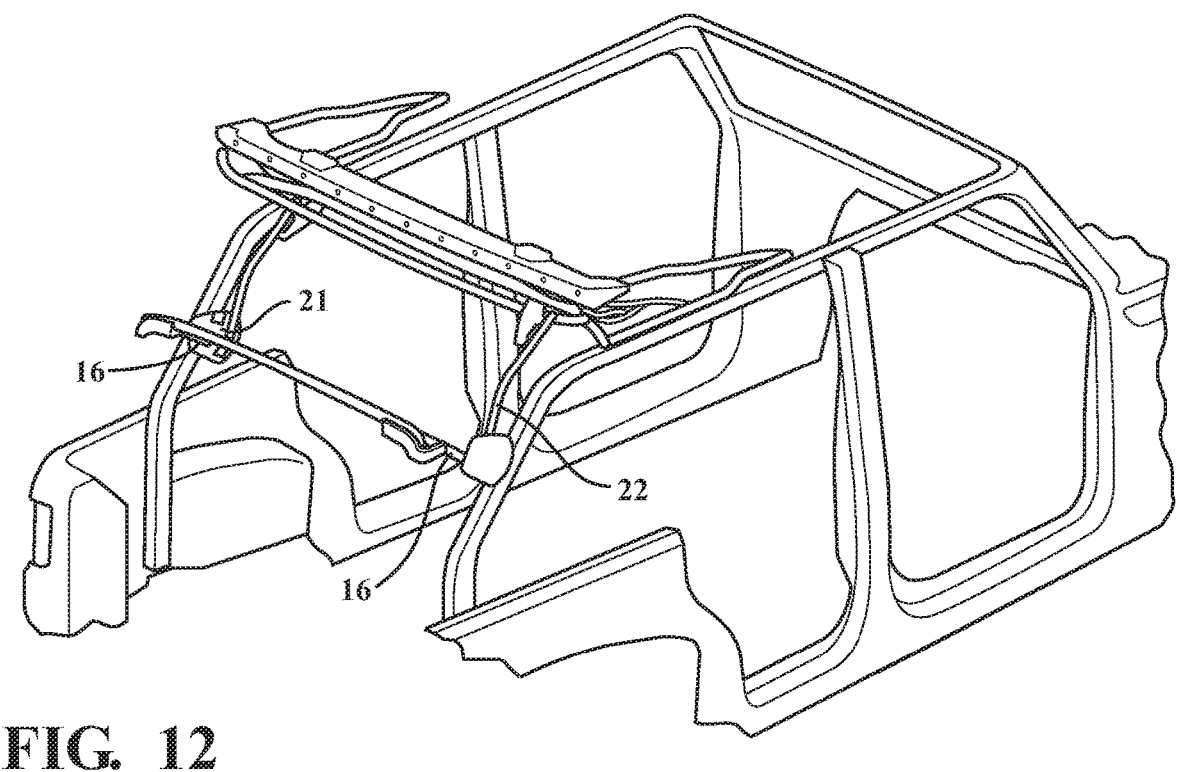
FIG. 12 is a perspective view of the exemplary soft top assembly, depicted rotating rearward from the closed position to the exemplary open/sunroof position, with the locking lift assist assembly in a first locked position, in accordance with the present invention.

Referring more particularly to FIGS. 4-10, with the handle member 46 beginning in the unlocked position (see FIGS. 4-7) and then rotating in the second direction 'c' (see FIG. 8) causes the first portion 52 rotation generally downward until reaching the locked position (see FIGS. 9-10). Once the handle member 46 rotates in the second direction 'c'—the second portion 54 of the handle 46 clears the protrusion 56 and the cam lockout 42 is free to rotate in the first direction 'd'. As the cam lockout 42 rotates in the first direction 'd', the rotatable member 44 rotates in the second direction 'e' until the abutting surface 36 of the cam lockout 42 and the second surface 50 of the rotatable member 44 meet (see FIGS. 10 and 3). Thus, the cam lockout 42 stops the rotatable member 44 from being able to rotate any further in that direction.

Referring to FIGS. 1-10 generally, when the cam 30 is in a first position the cam 30 abuts against the surface 48 on the rotatable member 44 preventing rotation of the rotatable member 44 in that direction (See FIG. 2). In this first locked position (or "cam locked position"), where the cam 30 prevents rotation of the rotatable member 44 in one direction (e.g., counterclockwise), the handle 46 can remain in an unlocked position (see FIG. 2). When the cam 30 is rotated out of engagement with the rotatable member 44 by the cable 26, the rotatable member 44 is then able to rotate to any intermediate position (e.g., see FIG. 8). Once the handle member 46 rotates a predetermined amount to a locked position, as set forth previously, the rotatable member 44 rotates back in the other direction until the second surface 50 of the rotatable member 44 abuts against the surface 36 of the lockout cam 42 (see FIGS. 3 and 10). Thus, the handle member 46 is also rotatable to a respective locked position (or "handle locked position") (See FIGS. 3 and 10) where the position is then selectively held.

Preferably, when the assembly 10 is in a first position, where the cam 30 abuts against the surface 48 of the rotatable member 44 (see FIG. 2), the second upward bow 22 is held in place, thereby holding the soft top assembly 14 in the open/sunroof position. This stops the whole soft top system from rolling down. However, preferably, the cam 30 can be rotated out of engagement with the rotatable member 44 and the handle mechanism 46 can be rotated to the locked position, and, preferably, the second upward bow 22 can be rotated into the downward position (indicated in phantom in FIG. 1) along with the first upward bow 16 rotated (as indicated by arrow 'f') into the downward position (see FIG. 13), and the cam lockout 42 abuts against the second surface 50 of the rotatable member 44 (see FIG. 3).

According to an embodiment of the present invention, when the assembly 10 is in a second position, where the surface 36 of the cam lockout 42 abuts against the opposite surface 50 of the rotatable member 44 (see FIG. 3), the first and/or second upward bows 16,22 is/are prevented from rotating back up to the open/sunroof position.

Preferably, the lift assist locking mechanism is a spring lift assist assembly incorporating a coil spring arrangement. Most preferably, a clock spring 58 is operably coupled to at least the housing 20 and about at least the joint 23b area. The clock spring 58 is operably coiled and mounted relative to the rotating features of the joint 23a,23b. Preferably, one end of the clock spring 58 is operably mounted to the housing 20. The clock spring 58 is windable about the joint area 23a and/or 23b. The clock spring 58 torque or torsional force stops from unwinding or rotating movement. Other springs or suitable torsion mechanisms are contemplated depending on the application without departure from the scope of the present invention.

In accordance with the present invention, lift assist lockdown faction is inside of the lockdown mechanism, which has advantageous over outside the mechanism. Previously, the lockdown position only could be locked from one position. In accordance with the present invention, the handle member 46 can move to be locked in any position. FIGS. 4 to 10 illustrate exemplary lockdown rotation.

Figure 15:
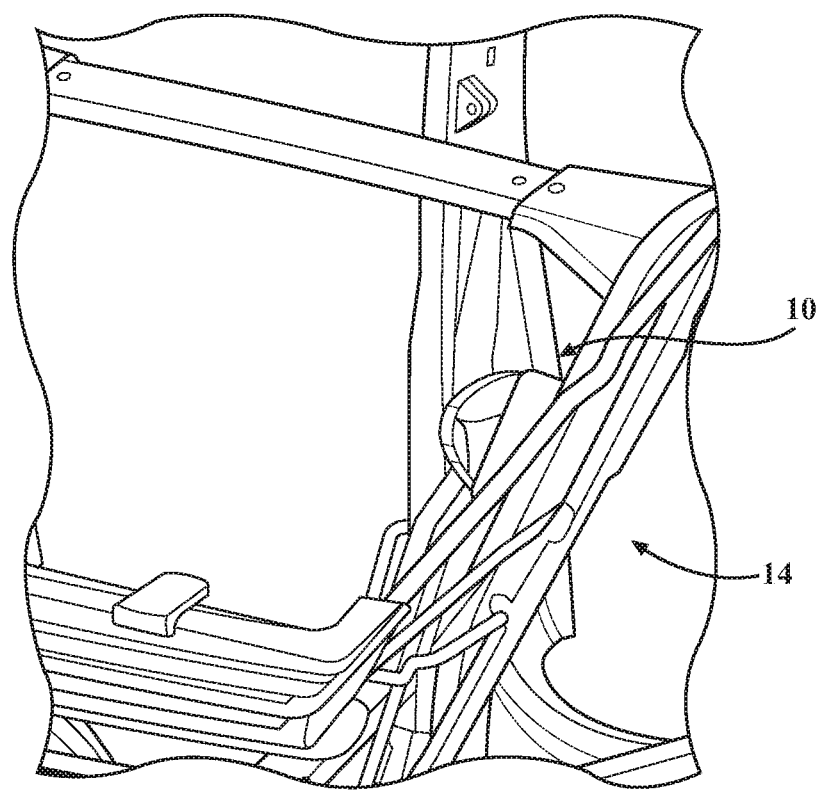
FIG. 15 is a perspective view of the exemplary soft top assembly, depicted in an exemplary open/downward position, with the locking lift assist assembly in a second locked position and the first upward bow omitted for clarity, in accordance with the present invention.

Referring more particularly to FIGS. 11-12 and 14-15, an exemplary soft top assembly is shown generally at 14. It is understood, however, that the locking lift assist assembly 10 of the present invention is adaptable for use with any other soft top depending on the application without departing from the scope of the present invention, e.g., folding soft top for an SUV, folding/sliding soft top for an SUV, soft top for 2-door SUV, soft top for 4-door SUV, etc. Preferably, the soft top assembly 14 is foldable rearward (see FIG. 14) to move the top between the closed position (see FIG. 11) and the open/sunroof position (see FIG. 12). The closed position closes off a roof top opening. The open/sunroof position uncovers the roof top opening, e.g., generally over the front cockpit or generally over the front and rear cockpits). The soft top assembly 14 is further operably moveable to an open/downward position (see FIG. 15), e.g., via guide rollers carried in tracks that are connected to opposing sport bars for controlled motion of the soft top between the open/sunroof position (FIG. 12) and the open/downward position (FIG. 15).

Figure 13:
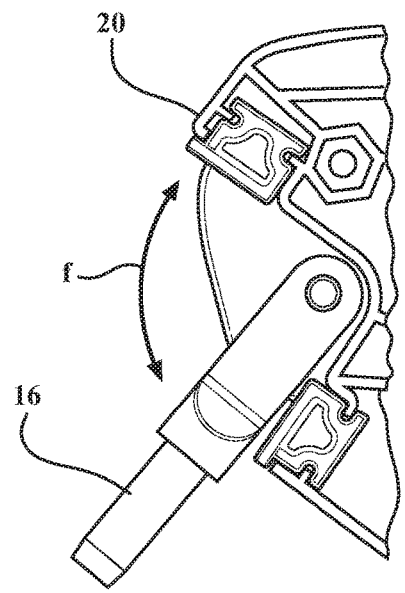
FIG. 13 is a perspective view of the exemplary soft top assembly, depicted in an exemplary open/sunroof position, with the locking lift assist assembly in the first locked position, in accordance with the present invention.
Figure 14:
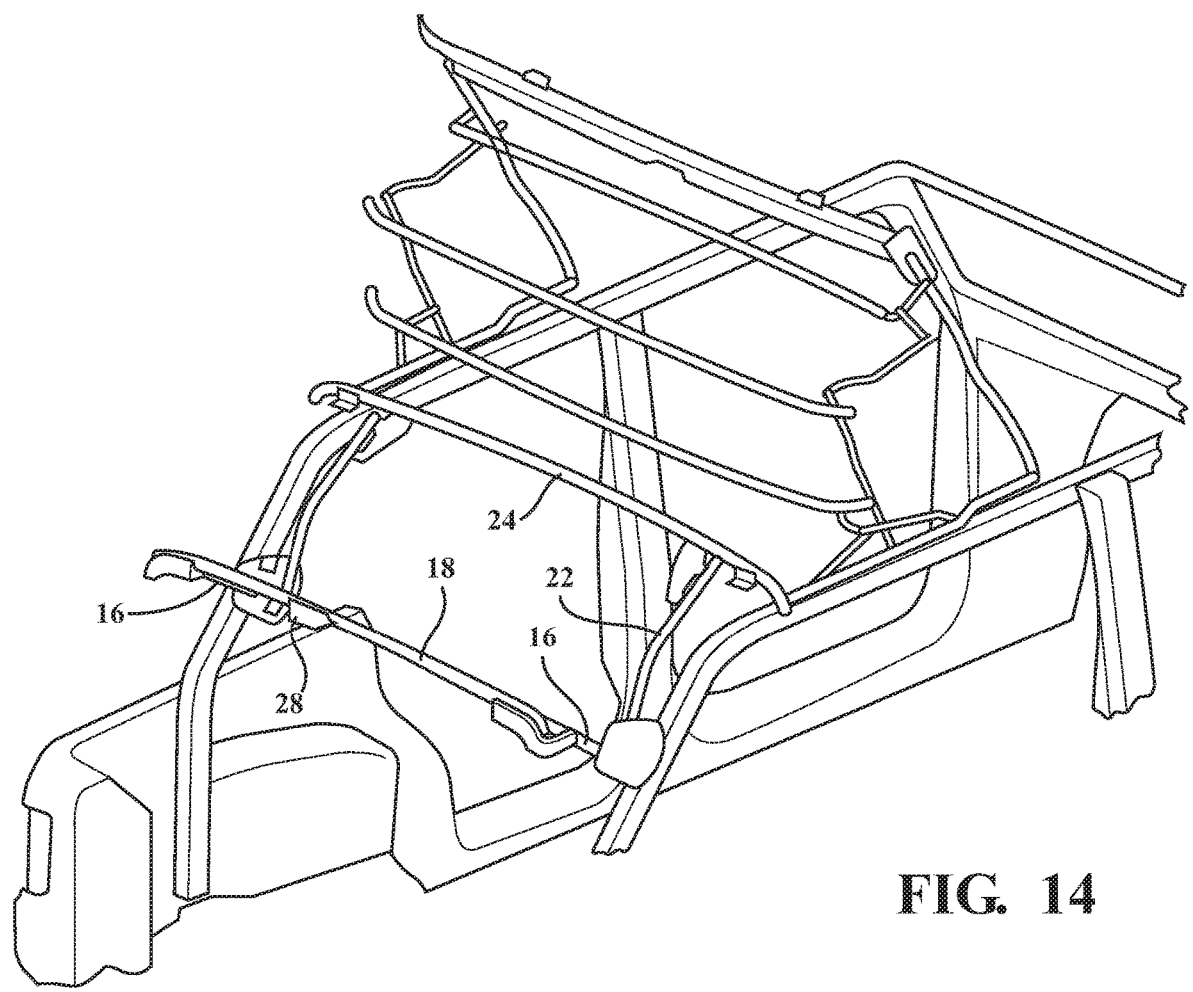
FIG. 14 is a side elevation of a segment of the locking lift assist assembly depicting the first upward bow rotated to a downward position, in accordance with the present invention.

FIG. 13 illustrates the first upward bow 16 rotated downward in a stowed position (e.g., the soft top assembly 14 has been folded and slid rearward and rotated downward thereby causing the first and second upward bows 16 and 22 to rotate to the downward position, along with the rest of the top/cover/bows/linkages/fabric management bows/side rails/rollers, etc.).

Referring to FIGS. 1-15 generally, it is understood that the right hand lift assist assembly is substantially a mirror image to the left hand lift assist assembly. The assemblies 10,10 are preferably connected to opposing sport bars 12,12. Preferably, a single pull of the handle mechanism 28 can unlock both assemblies 10,10 simultaneously.

The lift assist assembly 10 is adaptable and utilizable with any soft top assembly for a convertible roof, four-door sport-utility vehicles, two-door sport-utility vehicles or any other vehicle of any kind depending on the application without departing from the scope of the present invention.

The lift assist locking mechanism is adaptable to any articulating soft top assembly where controlling the movement of the soft top between a sunroof position and at least one further rearward opened position is desired.

When locked in the down position, it is also contemplated that the soft top assembly 14 can be removed from the vehicle.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A locking lift assist system for a vehicle, comprising:
a housing operably connected to the vehicle;
a rotatable member rotatably connected within the housing;
a cam operably rotatably connected to the housing, said rotatable member including a first surface to selectively engage said cam to prevent rotation of said rotatable member in a first direction;
a cam lockout operably rotatably connected to the housing, said rotatable member including a second surface to selectively engage said cam lockout to prevent rotation of said rotatable member in a second direction; and
a handle member operably rotatably connected within the housing, having the same axis of rotation with the rotatable member, said handle member selectively rotatable between an unlocked and a locked position, wherein said locked position of said handle member allows said cam lockout to rotate into engagement with said second surface of said rotatable member to prevent rotation of said rotatable member in said second direction.

2. The locking lift assist assembly of claim 1, wherein rotating said handle member to said unlocked position causes said handle member to push said cam lockout out of engagement with said second surface allowing said rotatable member to rotate in said second direction.

3. The locking lift assist assembly of claim 1, wherein said handle member includes a first portion that is an operator accessible handle outside of said housing and a second portion that is located within said housing, wherein said second portion causes rotation of said cam lockout into/out of abutting engagement with said rotatable portion when said operator selectively rotates said handle member between said locked and unlocked positions.

4. The locking lift assist assembly of claim 1, further comprising a handle release mechanism operably connected to said cam to selectively cause rotation of said cam out of abutting engagement with said first surface thereby allowing said rotatable member to rotate in said first direction.

5. The locking lift assist assembly of claim 1, further comprising an operator handle release mechanism with a cable operably connected to the cam to rotate the cam to an unlocked position out of contact with said rotatable member when desired.

6. The locking lift assist assembly of claim 1, further comprising a clock spring operably coupled adjacent to the rotatable member, said clock spring operably unwinds in one direction of said rotation and operably winds up in the other direction of said rotation.

7. The locking lift assist assembly of claim 1, further comprising at least one upward bow operably rotatably connected adjacent to said handle member, wherein when said handle member is in one of said locked or unlocked positions said cam is in abutting engagement with said rotatable member and prevents said at least one upward bow from rotating in a first direction, and wherein when said handle member is in the other of said locked or unlocked positions said cam lockout is in abutting engagement with said rotatable member and prevents said at least one upward bow from rotating in the same or a second direction.

8. The locking lift assist assembly of claim 7, wherein said at least one upward bow is part of a soft top assembly operably moveable between an open/sunroof position and an open/downward position, wherein selectively rotating said at least one upward bow in a rearward/downward direction allows said soft top assembly to rotate to said open/downward position.

9. The locking lift assist assembly of claim 1, further comprising an arm operably coupled to said housing and at least one upward bow operably coupled to said arm, wherein said rotatable member and handle member are rotatably connected to said arm within said housing, and wherein said at least one upward bow is rotatably connected to said arm outside of said housing.

10. The locking lift assist assembly of claim 9, further comprising another upward bow operably rotatably connected to said housing, wherein rotating said upward bow and said another upward bow rotates a soft top assembly between an open/sunroof position and an open/downward position.

11. The locking lift assist assembly of claim 1, wherein said locking lift assist assembly is operably connected to a sport bar of the vehicle.

12. The locking lift assist assembly of claim 1, wherein said cam is biased to a cam locking position against said first surface of said rotatable member by a spring.

13. The locking lift assist assembly of claim 1, wherein said cam lockout further comprises a protrusion against said handle member, wherein said protrusion is guided by rotation of said handle member to allow rotation of said cam lockout in/out of engagement with said rotatable member.

14. The locking lift assist assembly of claim 1, wherein two of said lift assist assemblies are incorporated with a soft top assembly that is moveable between a closed position to cover a roof top open, an open/sunroof position, and an open/down position, wherein said locking lift assist assemblies selectively lock said soft top assembly in said open/sunroof position with said cam or cam lockout against said rotatable member and selectively locks said soft top assembly in said open/downward position with the other of said cam or cam lockout against said rotatable member.

15. A locking lift assist assembly for a sport utility vehicle, comprising:
- a housing operably connected to the sport utility vehicle;
- a rotatable member rotatably coupled within the housing to an arm;
- a cam operably rotatably connected to the housing, said rotatable member including a first surface to selectively engage said cam to prevent rotation of said rotatable member in a first direction, wherein said cam is biased cam locking position in contact with said first surface of said rotatable member;
- a cam lockout operably rotatably connected to the housing, said rotatable member including a second surface to selectively engage said cam lockout to prevent rotation of said rotatable member in a second direction;
- a first upward bow operably rotatably connected to the housing;
- an opening formed in said housing to allow selective rotation of said first upward bow by an operator when desired;
- a second upward bow rotatably coupled to said arm at a location outside of said housing;
- a handle member rotatably coupled to said arm at a location within said housing, said handle member selectively rotatable between an unlocked and a locked position to allow said rotatable member to abuttingly engage said cam or said cam lockout to prevent further rotation of said rotatable member to keep said second upward bow from rotating in said first or second direction when desired.

16. The locking lift assist assembly of claim 15, wherein said cam lockout further comprises a protrusion against said handle member, wherein said cam lockout rotation is guided by said protrusion against said handle member to allow rotation of said cam lockout into/out of engagement with said rotatable member.

17. The locking lift assist assembly of claim 15, further comprising an operator handle release mechanism with a cable operably connected to the cam to rotate the cam to an unlocked position out of contact with said rotatable member when desired.

18. A lift assist lockdown assembly for a sport utility vehicle soft top assembly, comprising:
- a shaft connected to an upward bow coupled to the soft top assembly, wherein the upward bow is rotatable between an upward position and a downward position;
- a rotatable member operably connected to the shaft and rotatable in a first direction and a second direction;
- a cam rotatably mounted for selective movement between a biased locked position and an unlocked position, wherein the locked position prevents rotation of the rotatable member in the first direction to keep the upward bow in an upward open/sunroof position;
- a cam lockout rotatably mounted in proximity to the rotating member;
- a handle member operably connected to the shaft for selective movement between a locked position and an unlocked position, wherein the locked position allows the cam lockout to come into engagement with the rotatable member to prevent rotation of the rotatable member in the second direction to keep the upward bow in an open/downward position.

19. The locking lift assist assembly of claim 18, further comprising an operator handle release mechanism with a cord connected to the cam to selectively rotate the cam to the unlocked position.

20. The locking lift assist assembly of claim 18, further comprising a clock spring with predetermined torque to stop unwinding and thereby rotation.

\* \* \* \* \*